(12) United States Patent
Szczepaniak et al.

(10) Patent No.: US 9,974,414 B2
(45) Date of Patent: May 22, 2018

(54) OVEN RACK FOR DEFLECTING GREASE DRIPPINGS

(71) Applicant: Alto-Shaam, Inc., Menomonee Falls, WI (US)

(72) Inventors: Andrew Szczepaniak, Hartland, WI (US); Joseph M. Kulakowski, Milwaukee, WI (US); Andrew Paul Mayeshiba, Fox Point, WI (US); Thomas Rand, Cedarburg, WI (US); Thomas C. Stollenwerk, Mayville, WI (US); Joshua Paul Wittig, West Allis, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 202 days.

(21) Appl. No.: 14/926,466

(22) Filed: Oct. 29, 2015

(65) Prior Publication Data

US 2017/0119216 A1    May 4, 2017

(51) Int. Cl.
*A47J 43/18* (2006.01)
*A47J 37/07* (2006.01)

(52) U.S. Cl.
CPC .............. *A47J 43/18* (2013.01); *A47J 37/07* (2013.01); *A47J 37/0786* (2013.01)

(58) Field of Classification Search
CPC ......... A47J 43/18; A47J 37/07; A47J 37/0786
See application file for complete search history.

(56) References Cited

U.S. PATENT DOCUMENTS

| | | | | | |
|---|---|---|---|---|---|
| 1,779,304 | A | * | 10/1930 | Antrim | F24C 15/18 126/41 E |
| 2,004,025 | A | * | 6/1935 | Van Voorst, Jr. | F24C 15/16 126/339 |
| 2,287,309 | A | * | 6/1942 | Howard | F24C 15/14 126/337 R |
| 2,291,359 | A | * | 7/1942 | Uhlrig | A47J 37/015 219/393 |
| 2,985,097 | A | * | 5/1961 | Nevin | A47J 37/0682 126/41 R |
| 3,333,529 | A | * | 8/1967 | Wilson | A21B 1/46 198/797 |
| 3,348,472 | A | * | 10/1967 | Anetsberger | A47J 37/0682 126/41 R |
| 3,899,961 | A | * | 8/1975 | Tanguy | A47J 37/041 126/38 |
| 4,126,087 | A | * | 11/1978 | McLamb | A47J 37/06 99/327 |
| 4,773,319 | A | * | 9/1988 | Holland | A47J 37/0713 126/25 R |
| 4,787,364 | A | * | 11/1988 | Zepeda | A47J 37/0682 126/41 R |
| 5,313,877 | A | * | 5/1994 | Holland | A47J 37/0704 126/25 R |
| 5,529,798 | A | | 6/1996 | Clark et al. | |

(Continued)

*Primary Examiner* — Anthony Weier
(74) *Attorney, Agent, or Firm* — Boyle Fredickson S.C.

(57) ABSTRACT

An oven tray rack for insertion into a food rack assembly is provided having upwardly and inwardly extending food holders and downwardly and inwardly extending grease deflectors for diverting grease to a center area of the tray rack and preventing grease from dripping onto food on lower tray racks.

9 Claims, 5 Drawing Sheets

(56) References Cited

U.S. PATENT DOCUMENTS

| | | | |
|---|---|---|---|
| 5,890,422 A * | 4/1999 | Clark | A47J 37/0786 99/400 |
| D660,647 S | 5/2012 | Casey et al. | |
| 2009/0260526 A1 | 10/2009 | Anderson et al. | |

* cited by examiner

OVEN RACK FOR DEFLECTING GREASE DRIPPINGS

BACKGROUND OF THE INVENTION

The present invention relates to cooking racks for holding food product to be placed in an oven, and in particular, to a cooking rack for deflecting grease draining from the food.

Commercial "pan capacity" ovens or cabinets for cooking or warming food product are commonly used by food service establishments that prepare large quantities of food. These ovens typically allow for vertical stacking of multiple sheet pans or racks for cooking or warming. These units aid in high-volume operations to increase an operation's efficiency and speed of service.

Some food products, when cooked, produce significant quantities of grease or food drippings which may be allowed to drain away from the food and to be captured by a drip collection tray positioned at the bottom of the oven. The drip collection tray funnels the collected grease to a drain line to allow gravity draining of the grease into a grease collection container for disposal. Some ovens provide inclined grease collection panels positioned at the floor of the oven that direct the grease directly to a drain line for automatically delivering the grease to a grease collection container for disposal. By allowing the grease to drain away from the food, the cooking of the food is improved, the risk of smoking and combustion from the grease is decreased, and the need for personnel to handle hot grease when removing the food product is reduced. It is understood that "grease" as discussed in the present application may relate to food drippings or other fat and juices released from the food during cooking.

SUMMARY OF THE INVENTION

The present inventors have recognized that a typical rack allows grease dripping from food held on the rack to fall onto food product positioned on a lower food rack. In this respect, grease can collect on lower food product and be obstructed from draining away into the drip collection tray or drain line by lower food racks and their food items. Grease collection on lower food product can result in uneven cooking affecting the color and texture of the food product. Moreover, the grease striking the lower food product may splatter onto the walls and over substantially an entire floor of the oven making grease collection more difficult. The present inventors have recognized that the desired spacing of food product in the oven will naturally produce a center channel that can be used for unobstructed conduction of grease from the uppermost rack to the center drain. The present invention provides an oven tray rack that funnels grease at each level to the center area removed from the oven walls and other food product.

Accordingly, the present invention provides an oven tray rack for insertion into a food rack assembly having upwardly and inwardly extending food holders, and downwardly and inwardly extending grease deflectors for diverting grease to a center area of the tray rack and preventing grease from dripping on food product positioned on lower tray racks.

In one embodiment, the present invention may be an oven rack for an oven having a frame having lateral supports sized to support the frame in a horizontal orientation on opposing rack support walls, the frame having transverse supports extending substantially an entire width of the oven between the rack support walls along a horizontal plane; at least one first food holder coupled to the frame and extending upwardly therefrom; a first grease deflection plate attached to the frame at one edge to provide a distal end extending downward from the frame below the one edge, the first grease deflection plate disposed below at least one first food holder and extending downwardly and inwardly toward a center of the rack; at least one second food holder coupled to the frame and extending upwardly therefrom; and a second grease deflection plate attached to the frame at one edge to provide a distal end extending downward from the frame below the one edge, the second grease deflection plate disposed below at least one second food holder and extending downwardly and inwardly toward a center of the rack.

It is thus a feature of at least one embodiment of the invention to divert grease dripping from the food product to a center area of the oven where the drain is normally located.

The downward angle of the first and second grease deflection plates from horizontal may be between 15 and 45 degrees.

It is thus a feature of at least one embodiment of the invention to facilitate gravity dripping of the grease from the deflection plates to the central oven drain.

The first grease deflection plate and second grease deflection plate may provide a channel between distal ends of the first and second grease deflection plates that is substantially centered in the oven rack.

It is thus a feature of at least one embodiment of the invention to confine the grease drippings to an area defined by the channel and that automatically centers itself within the oven when installed.

The supports may be transversely extending bars allowing sliding of the rack into and out of the oven on wall supports.

It is thus a feature of at least one embodiment of the invention to allow the oven rack to be suspended between rack support walls of an oven without needing to install shelving to support the rack.

The food holders may extend upwardly at an angle from vertical canted toward a center of the rack as one moves upward.

It is thus a feature of at least one embodiment of the invention to prevent grease from the food from dripping or splattering onto the oven walls.

The food holders are attached to the frame at a location displaced inwardly of an attachment of the first and second grease deflection plates to the frame.

It is thus a feature of at least one embodiment of the invention to prevent the food product from contacting the oven sidewalls or allow the grease to drip onto the oven sidewalls.

The oven rack has at least six food holders coupled thereon.

It is thus a feature of at least one embodiment of the invention to provide high capacity cooking.

The first and second grease deflection plates are attached to the frame at opposing side edges of the frame.

It is thus a feature of at least one embodiment of the invention to catch substantially all the grease falling from the food product onto the deflection plates.

The first grease deflection plate and second grease deflection plate may be cantilevers attached to the frame at one end and unattached from the frame at the distal end.

The present invention may also provide a method of collecting grease from food cooked in an oven, the method including the steps of providing a first oven rack as described above; and installing the first oven rack across opposing rack support walls of the oven wherein the channels provide a grease drip path.

The method may further include the step of providing a second oven rack as described above; and installing the second oven rack across opposing rack support walls wherein the second channel provides a grease drip path and wherein the first channel and second channel are substantially aligned so that the first drip path and second grease drip path combine to form a substantially unbroken drip path.

It is thus a feature of at least one embodiment of the invention to prevent, grease dripping from an uppermost oven rack onto food of a lower oven rack.

Installing the first oven rack and second oven rack into the oven may center the channels of the first oven rack and second oven rack over a center of the oven.

It is thus a feature of at least one embodiment of the invention to provide a clear drip path through the channels of multiple oven racks on multiple levels.

The method may further include the step of cooking food on the oven rack such that grease drips from the food to the deflection plate and drips off the distal end of the deflection plate to flow through the first and second channels.

These particular objects and advantages may apply to only some embodiments falling within the claims and thus do not define the scope of the invention.

DETAILED DESCRIPTION OF THE INVENTION

Referring now to FIGS. 1 through 6, a substantially rectangular tray frame 22 according to one embodiment of the present invention is provided for insertion into an oven rack support system 102 of an oven 100. The tray frame 22 supports upwardly extending food holders 28 for receiving food product 200, such as chicken, turkey, duck or the like, which may produce grease during cooking. The tray frame 22 also provides downwardly angled first and second deflector plates 30, 32 for diverting grease from the food product 200 to a center area of the tray frame 22.

Figure 1:
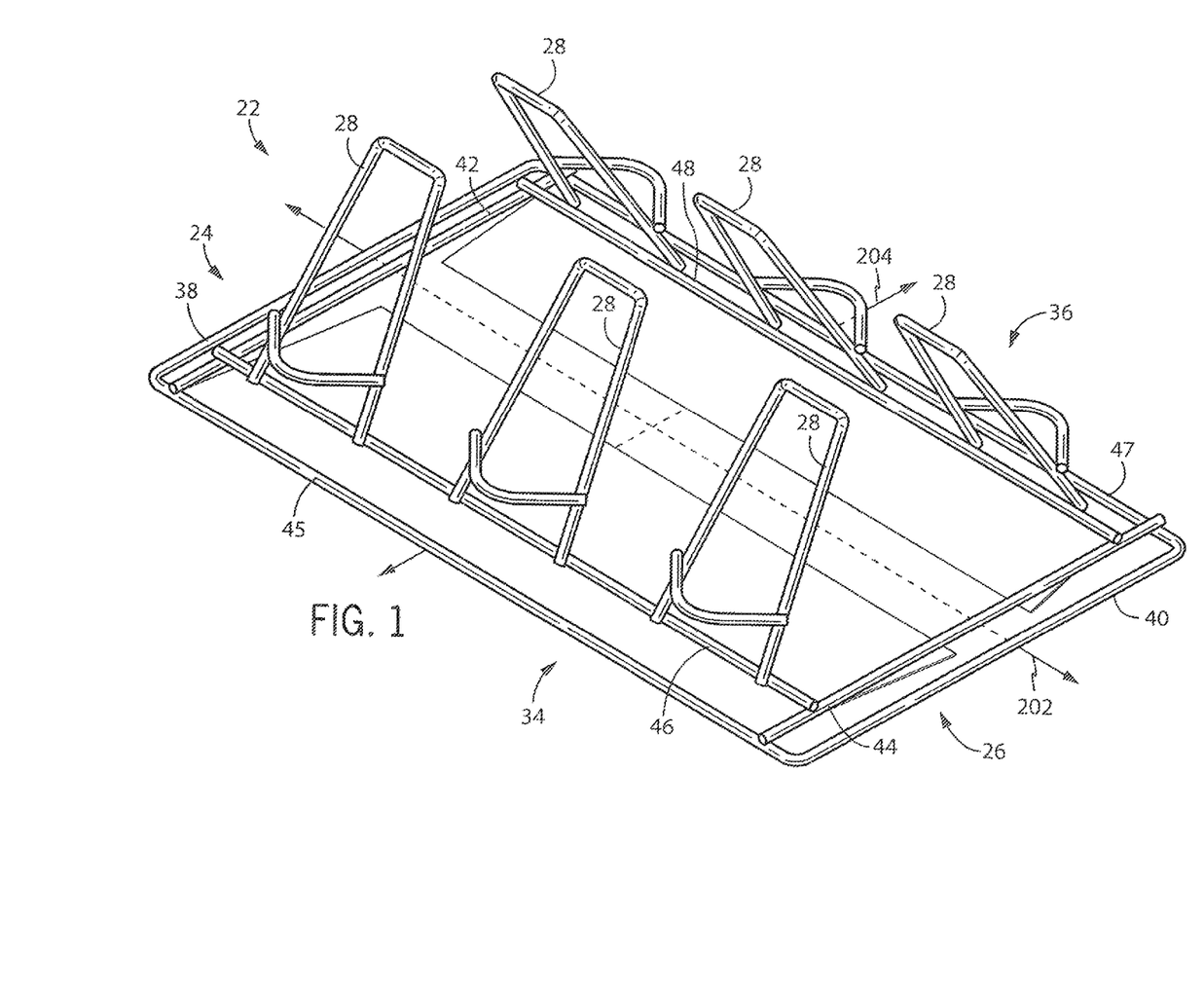
FIG. 1 is an isometric view of an oven rack, in accordance with the present invention, having panels for diverting the grease toward a center of the rack.
Figure 6:
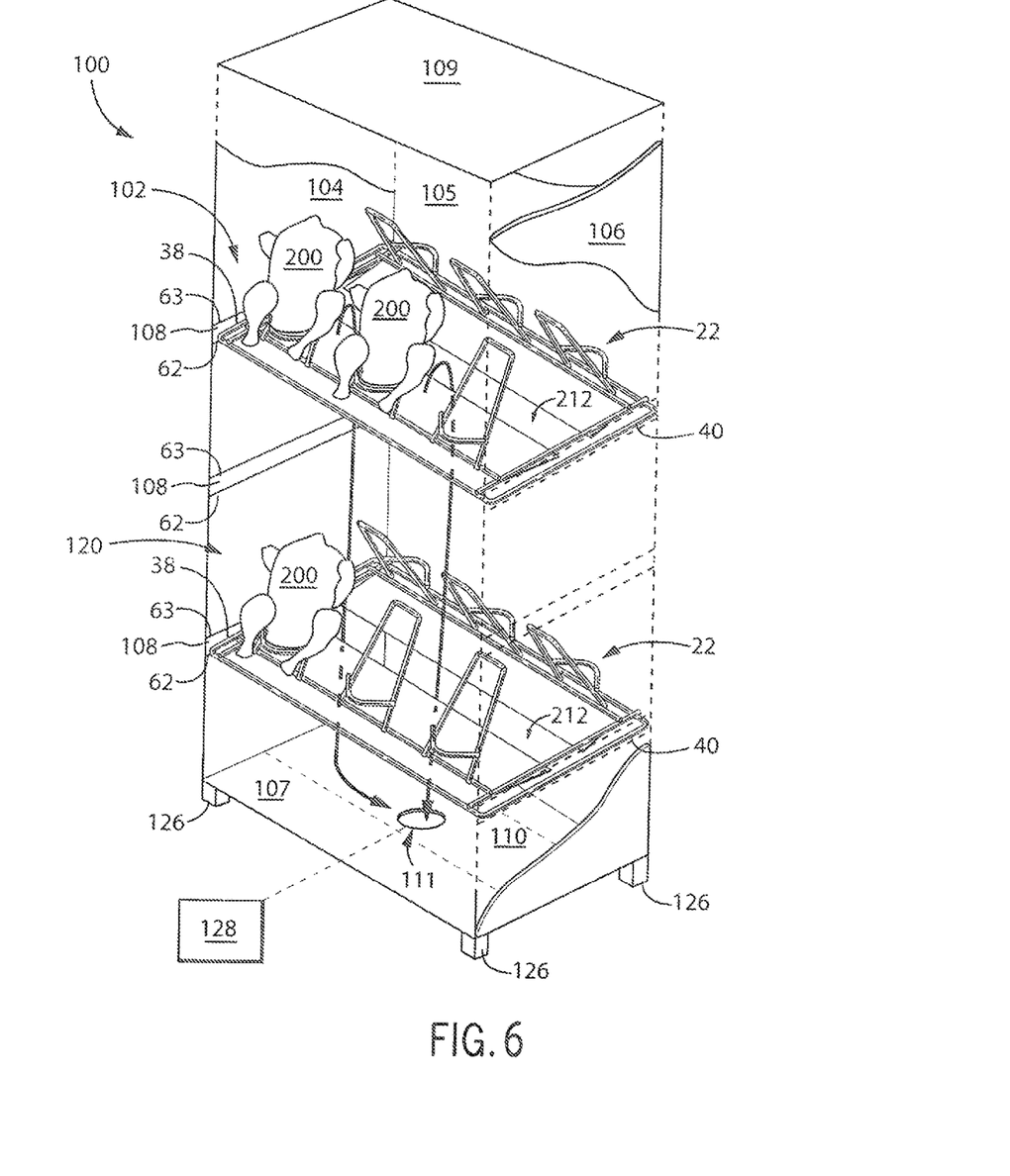
FIG. 6 is a cut-away perspective view of the oven rack of the present invention installed in a commercial oven with an additional oven rack installed therebelow and showing grease dripping from the food to a drain of the oven.

Referring now to FIGS. 1 and 6, the substantially rectangular tray frame 22 has a length commensurate with a width of the oven 100 between left and right sidewalls, and a width commensurate with a depth of the oven 100 between front and back sidewalls. The rectangular tray frame 22 may be formed by metal rods providing a left side 24 opposite a right side 26 for receipt into an oven rack support system 102, which may be ridges or pegs that support conventional cooking shelves or racks positioned horizontally therebetween vertically extending sidewalls 104, 106, as will be further described below. Extending at a front end of the left and right sides 24, 26 is a front side 34 and extending at a rear end of the left and right sides 24, 26 is a rear side 36 of the tray frame 22 for supporting food product therebetween the left and right sides 24, 26 for cooking and/or heating.

The tray frame 22 may be a plurality of support members, such as metal rods, defining a profile of the tray frame 22. A first and second support members 38, 40 may define the outer profile of the left and right sides 24, 26, respectively, and extend between the front and back sides 34, 36 to provide generally outwardly protruding tabs or lips sized for acceptance onto ridges or pegs of an oven rack support system 102 to support the tray frame 22 horizontally within the oven 100. For example, the oven rack support system 102 may have a support 108 providing a lower ledge 62 to support the lip of the tray frame 22 thereon. The oven rack support 102 will be further described below. The left and right sides 24, 26 may also serve as handles for gipping the tray frame 22. The distance between the first and second support members 38, 40 is generally commensurate with the width of the oven 100 between left and right sidewalls 104, 106.

A third and fourth support members 45, 47 may define the outer profile of the front and rear sides 34, 36, respectively, and extend between the first and second support members 38, 40. The distance between the third and fourth members 45, 47 is generally commensurate with the width of the oven 100 between a front sidewall or door (not shown) and back sidewall 105.

The first and second support members 38, 40 and third and fourth support members 45, 47 form an outer perimeter of the tray frame 22. The first and second support members 38, 40 and third and fourth support members 45, 47 may be a continuous piece of material, such a bent metal rod. Alternatively, the support members 38, 40, 45, 47 may be separate metal rods that are welded or otherwise bonded together.

Inset and substantially parallel to first and second support members 38, 40 are a fifth and sixth support members 42, 44, respectively. The support members 38, 40 are disposed inwardly from the support members 38, 40 so as to not interfere with insertion of the left and right sides 24, 26 into the oven rack support system 102. The support members 42, 44 may be welded to a top end of the support members 45, 47.

The first support member 38 and fifth support member 42 are arranged in close proximity to each other, and the second support member 40 and sixth support member 44 are arranged in close proximity to each other, in comparison to the much larger space provided between the fifth and sixth support members 42, 44. The space between the fifth and sixth support members 42, 44 generally corresponds to the width of three whole chickens arranged side by side, or may be between 15-22 inches or substantially 22 inches.

Inset and substantially parallel to third and fourth support members 45, 47, respectively, are a seventh and eighth support members 46, 48. The seventh and eighth support members 46, 48 extend inwardly from the third and fourth support members 45, 47 and between the fifth and sixth support members 42, 44 to support a plurality of food holders 28 on a top side 54 of the tray frame 22. The support members 46, 48 may be welded to a top end of the fifth and sixth support members 42, 44.

The third support member 45 and seventh support member 46 are generally arranged in close proximity to each other, and the fourth support member 47 and eighth support member 48 are generally arranged in close proximity to each other, in comparison to the larger space provided between the seventh and eighth support members 46, 48. The space between the seventh and eighth support members 46, 48 generally corresponds to the length of two whole chickens arranged front to back, or may be between 9-22 inches.

Figure 2:
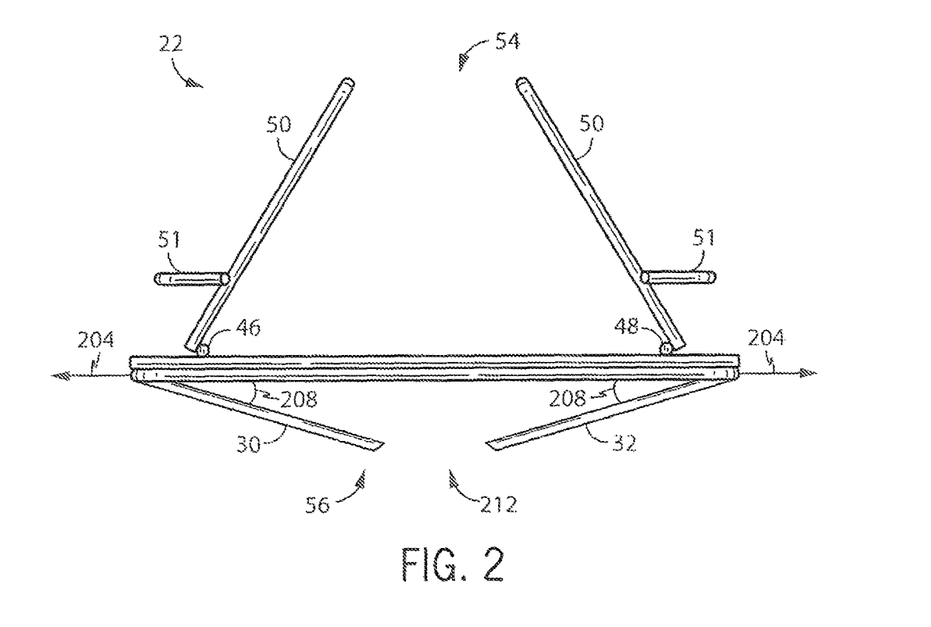
FIG. 2 is a front elevation view of the oven rack of FIG. 1.
Figure 3:
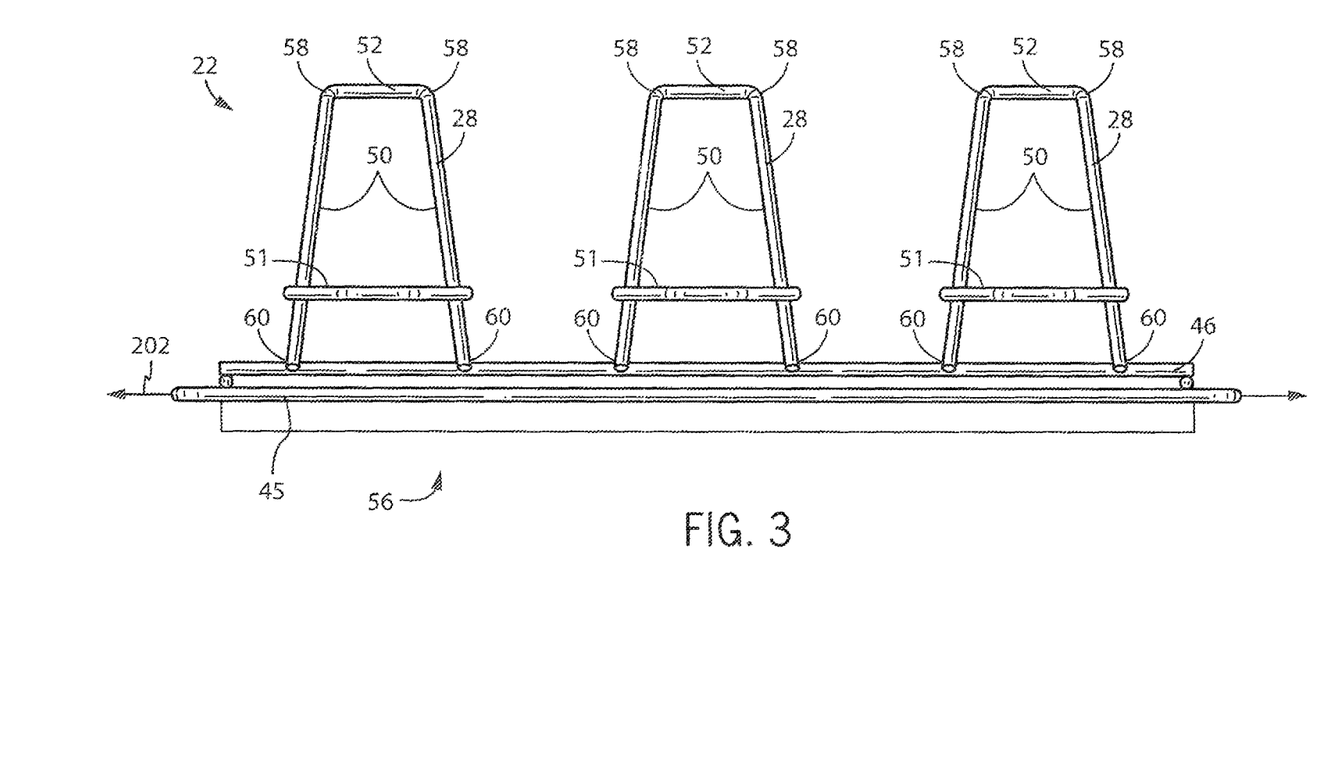
FIG. 3 is a right side elevation view of the oven rack of FIG. 1.

Referring also to FIGS. 2 and 3, disposed on a top side 54 of the tray frame 22, and welded to the seventh and eighth support members 46, 48, are a plurality of wedge shaped food holders 28. The food holders 28 are generally rectangular in shape with a slightly widened base for supporting, for example, a chicken thereon. The food holders 28 may be formed by a pair of upwardly extending bars 50 joined at a top end 58 by a horizontally extending bar 52 and welded at a lower end 60 to the seventh and eighth support members 46, 48. The pair of upwardly extending bars 50 angle toward one another, for example between 5 to 15 degrees from vertical, to form a broader base defined by the distance between the lower end 60 of the bars 50 and a narrower top end defined by the horizontally extending bar 52 and the distance between the top end 58 of the bars 50.

The food holders 28 extend generally upward from the tray frame 22 and are canted inwardly, for example between 10 to 30 degrees, from vertical toward an axis 202 of the tray frame 22 defined by a center line between the third and fourth support members 45, 47. The food holder 28 is typically inserted into a cavity of the chicken so that the chicken is also positioned upright and angled inward toward the central axis 202.

A generally U-shaped stop member 51 may extend horizontally between upwardly extending bars 50 and arch outwardly away from the central axis 202. The U-shaped stop member 51 is arranged above the lower end 60 of the bars 50 to prevent food product 200 from dropping below the food holder 28. In this respect, the stop member 51 may arch outward greater than a diameter opening of a chicken cavity to prevent the chicken from dropping below the U-shaped stop member 51.

Figure 4:
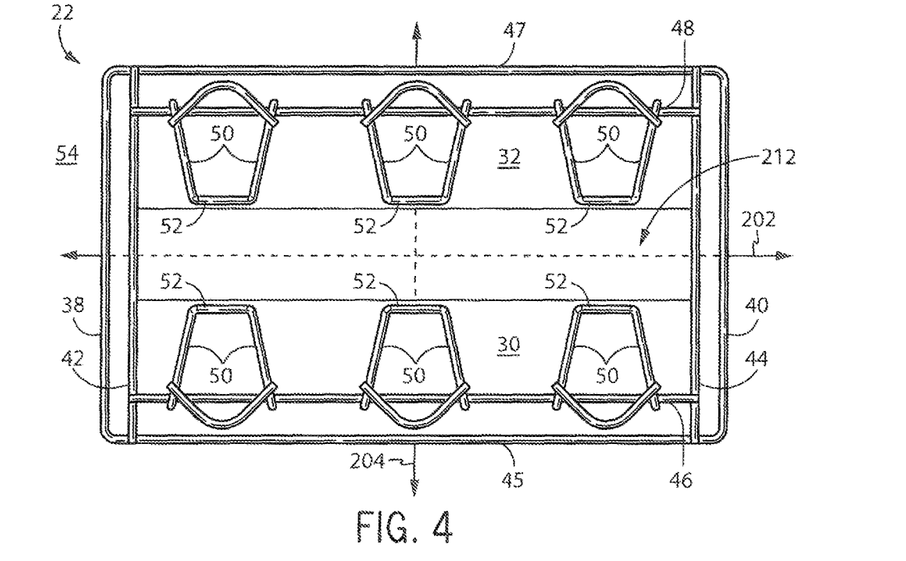
FIG. 4 is a top plan view of the oven rack of FIG. 1.
Figure 5:
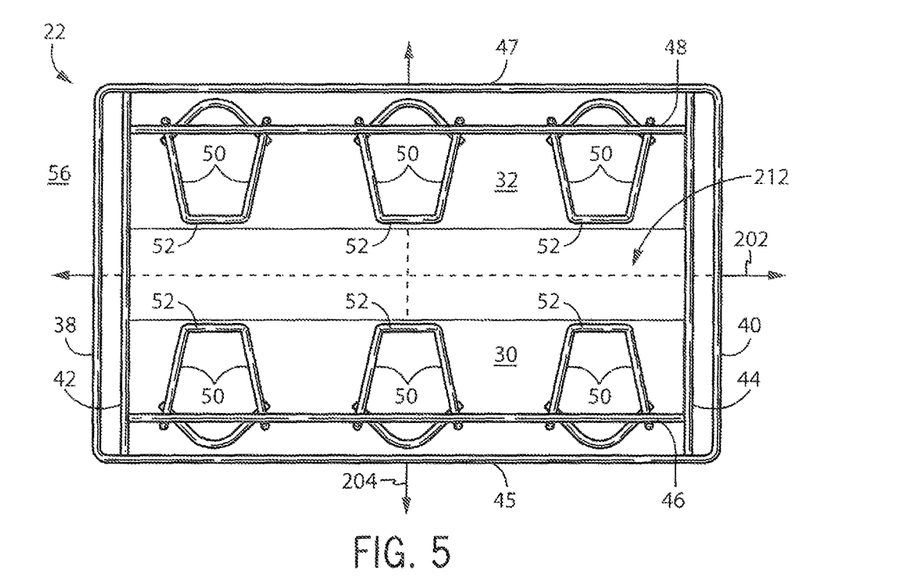
FIG. 5 is a bottom plan view of the oven rack of FIG. 1.

Referring also to FIGS. 4 and 5, the lower end 60 of the pair of upwardly extending bars 50 of food holders 28 are welded to the seventh and eighth support members 46, 48 in a spaced out fashion to provide clearance between cooking products 200. In an exemplary embodiment, three food holders 28 are arranged on the seventh support member 46, and three food holders 28 are arranged on the eighth support member 48, such that six chickens 200 may be placed on the tray frame 22 at the same time. The food holders 28 are spaced such that the breadth of chickens 200 on support member 46 do not interfere with each other, and the breadth of chickens 200 on support member 48 do not interfere with each other. Also, clearance between the horizontally extending bar 52 of opposing food holders 28 of support member 48 and support member 46, respectively, are such that the chickens 200 on the seventh support member 46 do not interfere with the chickens 200 on the eighth support member 46. It is understood that the desired spacing of food product 200 on the tray frame 22 may require a varied number of food holders 28 and varied spacing between food holders 28.

Support members 38, 40, 42, 44, 45, 46, 47, 48 and U-shaped stop members 50, 51, 52 may be singular pieces of bent metal, metal rods that are welded or otherwise bonded together, or combinations of both.

Disposed on a bottom side 56 of the tray frame 22, and welded to the third and fourth support members 45, 47 are a pair of cantilevered first and second deflector plates 30, 32, respectively. The deflector plates 30, 32 are generally rectangular in shape and generally planar, although they may be curved as desired. For example, the deflector plates 30, 32 may have ends that curve inward toward an axis 204 substantially perpendicular to axis 202 and defined by a centerline between the first and second support members 38, 40 to help funnel the grease toward a center of the tray frame 22.

The deflector plates 30, 32 are attached to the third and fourth support members 45, 47 and extend less than the full length of the front or back sides 34, 36 so as to not interfere with the protrusions formed by the first and second support members 38, 40 inserted into the oven rack support system 102. The deflector plates 30, 32 extend downwardly and inwardly toward the central axis 202 of the tray frame 22. The angle 208 formed between a plane formed by support members 38, 40, 45, 47 and the deflector plates 30, 32 may be between 15 and 45 degrees.

The deflector plates 30, 32 extend inwardly less than the full distance of the space between the third and fourth support members 45, 47 so as to provide a channel 212 therebetween the opposing deflector plates 30, 32. The channel 212 provided between the distal or outer edges of deflector plates 30, 32 is commensurate with the space between the horizontally extending bars 52 of adjacent food holders 28 of opposing support members 46, 48, respectively.

Referring now to FIG. 6, a partial cut-away of oven 100 is shown with an oven rack support 102 therein. The oven 100 has a plurality of walls defining a generally rectangular volume or cavity including a vertically extending back sidewall 105 joined on its left and right edges by vertically extending left 104 and right 106 side walls extending forward from the back sidewall 105. A top wall 109 and bottom wall 107 are joined to the upper and lower edges of the back wall 105 and side walls 104, 106, respectively, to define a ceiling and floor of an enclosable volume 120.

The volume 120 may be accessed through a door (removed) closeable over a front opening and which seals the interior of the volume 120 when the door is in a closed position. The door may be connected by a hinge attached to for example, a vertical edge of the left sidewall 104. The outer edge of the door may have a door gasket or other sealing material for sealing the connection between the door and the walls 104, 106, 107, 109 of the volume 120.

The left and right side walls 104, 106 and back wall 107 of the volume 120 may incorporate an inner electrical coil which provides heat to the volume 120. The left and right sidewalls 104, 106, back wall 107, bottom wall 107, and top wall 109, and may further incorporate an insulating material so as to retain heat within the volume 120 and to prevent heat from escaping. It is understood that the kitchen unit may have the required electrical circuitry and connections to properly power the unit and control the internal temperature, as is currently understood in the art.

The volume 120 may be supported on the ground by a number of supporting feet 126 disposed below the volume 120 and extending down from the bottom wall 107 to control and provide vertical elevation to the volume 120. According to one embodiment of the present invention, the supporting feet 126 are adjustable and positioned at each of the four corners of the exterior surface of the bottom wall 107 of the volume 120.

The bottom wall 107 of the oven provides a drain opening 111 allowing for the flow of grease and oils, for example, through a conduit to a waste container 128. The drain opening 111 is generally centered in the oven floor 107.

The inner surface of the volume 120 has an oven rack support 102 providing a plurality of outwardly extending and opposed supports 108 which may be ridges or pegs which hold food pans, trays, or racks directly by accepting the lip or handle of the pan, tray, or rack thereon without the use of shelving. Alternatively, the supports 108 may support conventional cooking shelves positioned horizontally therebetween the sidewalls 104, 106. The cooking shelves are able to support pans, trays, or racks of food of conventional shape and size. It is contemplated that the cooking shelves or racks may be installed in a number of different configurations so that different tray or rack heights may be held. The cooking shelves and racks are easily installed and uninstalled for cleaning and maintenance.

In an exemplary embodiment, the oven rack support system 102 may be a pair of guide rails providing a lower ridge 62 to support the lip or handle defined by the first and second support members 38, 40, of the tray frame 22 thereon. An upper ridge 63 parallel to and above the lower ridge 62 may restrict the first and second support members 38, 40 on a top end to prevent, the shelves or racks from lifting upwards and to retain the tray frame 22 on the supports 108.

The corresponding supports 108 of sidewalls 104, 106 are aligned at substantially equal heights so that the tray frame 22 installed thereon is substantially horizontal. In an alternative embodiment of the supports 108, the food rack assembly may provide indentations or channels in sidewalls 104, 106 instead of protrusions for receiving the first and second support members 38, 40 therein.

The oven rack support 102 provides a plurality of supports 108 that are vertically spaced along sidewalls 104, 106 to allow for a plurality of tray frames 22 to be inserted within the oven 100 and stacked vertically from each other. It should be understood that the oven 100 may include additional rack supports 102 that are not shown, as understood in the art.

In an alternative embodiment, instead of a built-in food rack assembly 20, the oven 100 may employ a trolley (not shown) that supports two generally rectangular vertically extending rack walls to its left and right which extend upward along and parallel to the left and right sidewall 104, 106 when installed within the volume 120. The trolley may be rolled into or out of the oven 100 so that the oven 100 may be quickly loaded or unloaded.

The tray frame 22 is installed onto the food rack assembly 20 by placing the first and second support members 38, 40 onto the lower ridges 62 of the supports 108 of the left and right vertically extending sidewalls 104, 106, respectively. If an upper ridge 63 is present, then the first and second support members 38, 40 are installed between the lower 62 and upper 63 ridges. The first and second support members 38, 40 may be installed by sliding a rear end of the support members 38, 40 toward a back wall 105 of the oven until the first and second support members 38, 40 are within the sidewalls 104, 106 of the oven 100.

In an installed position, the tray frame 22 is oriented so that the channel 212 between the deflector plates 30, 32 is generally centered between the front opening and back wall 105 of the oven 100. When another tray frame 22 is installed above or below the tray frame 22. The channels 212 of the tray frames 22 are aligned with respect to a vertical plane.

The food product 200 is placed on the food holders 28, for example, by placing the food holders 28 into the cavity of the chicken so that a tail of the chicken near the cavity opening rests on the U-shaped stop member 51. The chicken may be oriented so that a breast of the chicken extends outwardly from the tray frame 22.

During cooking, grease represented by arrows 206, will drip from the food product 200 downward onto the deflector plates 30, 32 by the force of gravity. The food holders 28 are welded on support members 46, 48 which are inset from the front and rear sides 34, 36 so that the chickens 200 do not contact the oven walls and the grease from the chickens 200 drip onto the deflector plates 30, 32 therebelow. The inward angle of the food holders 28 facilitates the downward drip of grease 206 from the food product 200 onto the deflector plates 30, 32.

The downward angle of the deflector plates 30, 32 facilitates the downward drip of grease 206 to the outer edges of the deflector plates 30, 32 and off the edges toward the bottom wall 107 of oven 100. The grease will generally fall to a drip area 110 defined by an area commensurate with the area defined of the channel 212 provided between deflector plates 30, 32. In this respect, grease does not fall onto all areas of the bottom wall 107.

If a second tray frame 22 is installed on a different level, the grease 206 will drip from the food product on the uppermost tray frame 22 onto the deflector plates 30, 32 of the uppermost tray frame 22 and off the outer edges of the deflector plates 30, 32 of the uppermost tray frame 22. The grease will then fall downward through the channel 212 of both the upper and lower trap frame 22. This is in contrast to grease dripping on the food product 200 of the lower tray frame 22. The grease 206 will bypass any food product 200 or tray structure of the lower tray frame 22 and fall to the drip area 110 of bottom wall 107 where it will proceed to flow to the drain opening 111. From the drain opening 111, the grease 206 may flow to the waste container 128 for disposal. The same unobstructed drip path through the channel 212 of a lower tray frame 22 would occur for any subsequent tray frame 22 installed therebelow an uppermost tray frame 22.

It is contemplated that in an alternative configuration, the channel 212 may extend between the front and back of the oven 100 so that it is generally centered between the left and right sidewalls 104, 106 of the oven 100. The food holders 28 may be arranged along the left and right sides of the oven 100 and the deflector plates may be attached at left and right sides of the tray frame 22 and extend downwardly and inwardly beneath the food holders 28. If a second tray frame 22 is installed on a different level, the channels 212 between the deflector plates 30, 32 would still be aligned in a similar manner as described above.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An oven rack for an oven comprising:
    a frame having lateral supports sized to support the frame in a horizontal orientation on opposing rack support walls, the frame having transverse supports extending substantially an entire width of the oven between the rack support walls along a horizontal plane;
    at least one first food holder coupled to the frame and extending upwardly therefrom;
    a first grease deflection plate attached to the frame at one edge to provide a distal end extending downward from the frame below the one edge, the first grease deflection plate disposed below at least one first food holder and extending downwardly and inwardly toward a center of the rack;
    at least one second food holder coupled to the frame and extending upwardly therefrom; and
    a second grease deflection plate attached to the frame at one edge to provide a distal end extending downward from the frame below the one edge, the second grease deflection plate disposed below at least one second food holder and extending downwardly and inwardly toward a center of the rack.

2. The oven rack of claim 1 wherein a downward angle of the first and second grease deflection plates from horizontal is between 15 and 45 degrees.

3. The oven rack of claim 1 wherein the first grease deflection plate and second grease deflection plate provide a channel between the distal ends of the first and second grease deflection plates that is substantially centered in the oven rack.

4. The oven rack of claim 1 wherein the lateral supports are transversely extending bars allowing sliding of the rack into and out of the oven on wall supports.

5. The oven rack of claim 1 wherein the food holders extend upwardly at an angle from vertical canted toward a center of the rack as one moves upward.

6. The oven rack of claim 1 wherein the food holders are attached to the frame at a location displaced inwardly of an attachment of the first and second grease deflection plates to the frame.

7. The oven rack of claim 1 wherein the oven rack has at least six food holders coupled thereon.

8. The oven rack of claim 1 wherein the first and second grease deflection plates are attached to the frame at opposing side edges of the frame.

9. The oven rack of claim 1 wherein the first grease deflection plate and second grease deflection plate are cantilevers attached to the frame at one end and unattached from the frame at the distal end.

* * * * *